US005651069A

United States Patent [19]
Rogaway

[11] Patent Number: 5,651,069
[45] Date of Patent: Jul. 22, 1997

[54] SOFTWARE-EFFICIENT MESSAGE AUTHENTICATION

[75] Inventor: Phillip W. Rogaway, Davis, Calif.

[73] Assignee: International Business Machines Corporation, Austin, Tex.

[21] Appl. No.: 351,618

[22] Filed: Dec. 8, 1994

[51] Int. Cl.$^6$ .................................................. H04L 9/00
[52] U.S. Cl. ................... 380/28; 380/23; 380/4; 380/49
[58] Field of Search ................... 380/23, 25, 49, 380/28, 3, 4

[56] References Cited

U.S. PATENT DOCUMENTS

| | | | |
|---|---|---|---|
| 4,935,962 | 6/1990 | Austin | 380/25 |
| 5,199,073 | 3/1993 | Scott | 380/49 |
| 5,493,614 | 2/1996 | Chaum | 380/23 |

*Primary Examiner*—David C. Cain
*Attorney, Agent, or Firm*—Jeffrey S. LaBaw; David H. Judson

[57] ABSTRACT

Fast message authentication code generation is achieved by preprocessing a secret key into an efficiently-computable representation of a hash function selected from a family of hash functions that share a characteristic property. The secret key is also mapped into a particular cryptographic transform. The hash function and the transform are used to generate the authentication code. In particular, the hash function is applied to the message to generate a hashed message. The cryptographic transform is then applied to the hashed message to generate a tag. The tag and possibly other information (such as the state of a counter) are then combined to create the authentication code.

17 Claims, 2 Drawing Sheets

SOFTWARE-EFFICIENT MESSAGE AUTHENTICATION

TECHNICAL FIELD

The present invention relates generally to cryptography and more particularly to methods by which a party can efficiently authenticate a message he sends to another party.

BACKGROUND OF THE INVENTION

Message authentication is a cryptographic protocol that is useful in a variety of computer applications. There are many known techniques by which a party can authenticate a message to be sent to another party. The parties who want to authenticate messages share a secret key. An adversary should be unable (with significant probability) to produce any properly-authenticated message for any message which he or she has not yet seen. Typically, a party authenticates a message by appending to it a short string, the "message authentication code". The receiving party then applies a verification procedure on the received message and its message authentication code to decide if the transmitted message is authentic. This may be accomplished by having the receiving party compute his or her own message authentication code and check to see whether the received and generated codes match.

One prior message authentication technique with certain advantages was described by M. Wegman and L. Carter in an article titled "New hash functions and their use in authentication and set equality", *J. of Computer and System Sciences*, 22, 265–279 (1981). In the Wegman-Carter approach, the communicating parties S and V share a secret key "a" which is thought of as specifying a random pad "p" and a hash function "h" drawn randomly from a family of hash functions "H" having certain properties. To authenticate a message "x", the sender transmits h(x) XORed with the next piece of the pad p. Therefore, in this approach, the message x is transformed first by a non-cryptographic operation (i.e., universal hashing); only then is it subjected to a cryptographic operation (i.e., encryption).

It is desirable to be able to compute message authentication codes frequently and over message strings that are hundreds or thousands of bytes long. Typically, however, no special-purpose hardware is available for this purpose, and prior code generation and verification schemes that are software-based do not provide sufficient speed, especially when implemented on a conventional workstation or personal computer. Message authentication thus often significantly reduces the machine's overall performance.

It would therefore be desirable to provide message authentication schemes that overcome these and other disadvantages of the prior art.

BRIEF SUMMARY OF THE INVENTION

It is thus a primary object of the invention to provide software-efficient techniques that facilitate fast message authentication.

It is a more particular object of the invention to describe a software-efficient method, using a secret key, to generate a message authentication code useful in authenticating a message.

Fast authentication code generation is achieved by preprocessing the secret key into an efficiently-computable representation of a hash function selected from a family of hash functions that share a characteristic property. The secret key is also mapped into a particular cryptographic transform. The hash function and the transform are then used to generate the authentication code. In particular, the hash function is applied to the message to generate a hashed message. The cryptographic transform is then applied to the hashed message to generate a tag. The tag and possibly other information (such as the state of a counter) are then combined to create the authentication code.

According to a more specific aspect of the invention, a method uses a secret key to generate a message authentication tag useful in authenticating a message. The method begins by mapping the key into an efficiently-computable representation of a hash function selected from a family of hash functions. The family of hash functions is characterized in that the probability that distinct strings hash to the same value using one of the hash functions is sufficiently small. The selected hash function is then applied to the message to generate a hashed message having a length that is substantially shorter than the length of the message. Then, a cryptographic transformation is applied to the hashed message and to the key to generate the message authentication tag. If the message is sufficiently long, the hashed message is computed at least in part by forming a string of words, with each word of the string being a function of (e.g., the XOR of) a unique subset of words drawn from the message. The usual efficiently-computable representation of the hash function is at least one table that specifies the subset of words that are exclusive-ORed to form each word of the string. Further reductions in the length of the hashed message are achieved using one or more other hash functions that share the characteristic property.

It is another object of the invention to describe a hashing procedure that takes a message and a key and generates a relatively short string, or hashed message. The method begins by mapping the key into an "association" of each word of the string to a set of words of the message. Each word of the string is then formed by combining the words of the message associated therewith. The association may be given by a table specifying, for each word of the string, the words of the message to which said word of the string is associated. Or the table may specify, for each word of the message, the words of the string to which said word of the message is associated. Alternatively, the association may be represented by a sequence of instructions executable on a computer, with the sequence of instructions computing each word of the string by combining the associated words of the message.

In a particular embodiment of this hashing routine, a secret key is initially mapped into a table that specifies unique subsets of a plurality of indices. Each index of the plurality identifies a "bucket" which is a physical construct (such as a register or other memory storage) in the computer. Each word drawn from the message string is then placed into a unique subset of the buckets defined in the table by the indices. The hashed message is then generated by forming a string, with each word of the string being the exclusive OR of the words cast into each bucket.

The various methods of the invention are implemented on a program storage device (e.g., a floppy diskette) that is readable by a processor and that tangibly embodies a program of instructions executable by the processor to perform the various process steps of each method.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

The novel message authentication scheme and the inventive hash function(s) used therein are optimized to perform efficiently in software and are preferably implemented on a 32-bit processor of conventional design. Such processors, e.g., include the Intel 386™, Intel 486™ and the Pentium™ Processor, as well as 32-bit Reduced Instruction Set Computer (RISC) processors such as the IBM PowerPC™. While these execution vehicles are preferred, the invention in the preferred embodiment detailed below is appropriate to any word-addressable general purpose 32-bit processor.

Figure 1:
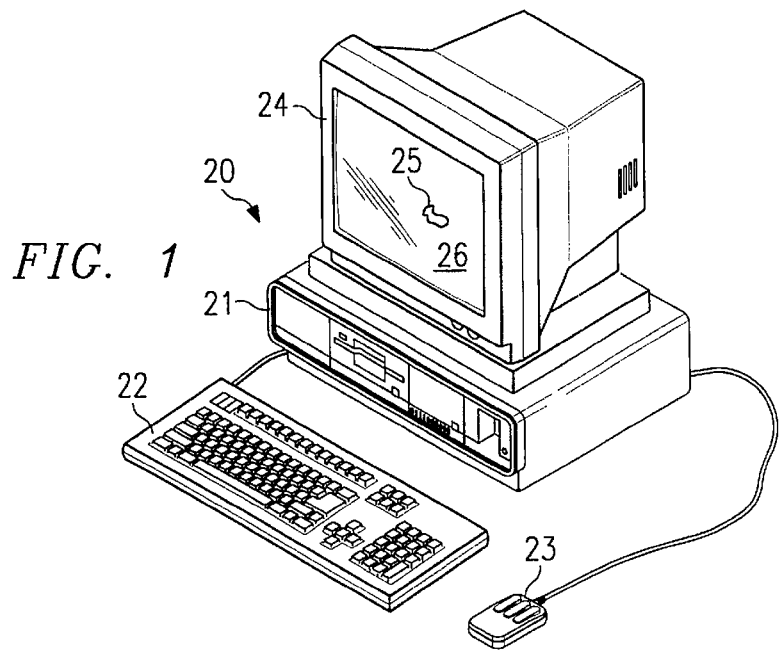
FIG. 1 illustrates a computer comprising a system unit, a keyboard, a mouse and a display, for use in implementing the message authentication method of the present invention.

By way of further background, a computer for use in supporting the invention is shown in FIG. 1. The computer 20 comprises a system unit 21, a keyboard 22, a mouse 23 and a display 24. The screen 26 of display device 24 is used to present a graphical user interface (GUI). The graphical user interface supported by the operating system allows the user to use a point and shoot method of input, i.e., by moving the mouse pointer 25 to an icon representing a data object at a particular location on the screen 26 and pressing on the mouse buttons to perform a user command or selection.

Figure 2:
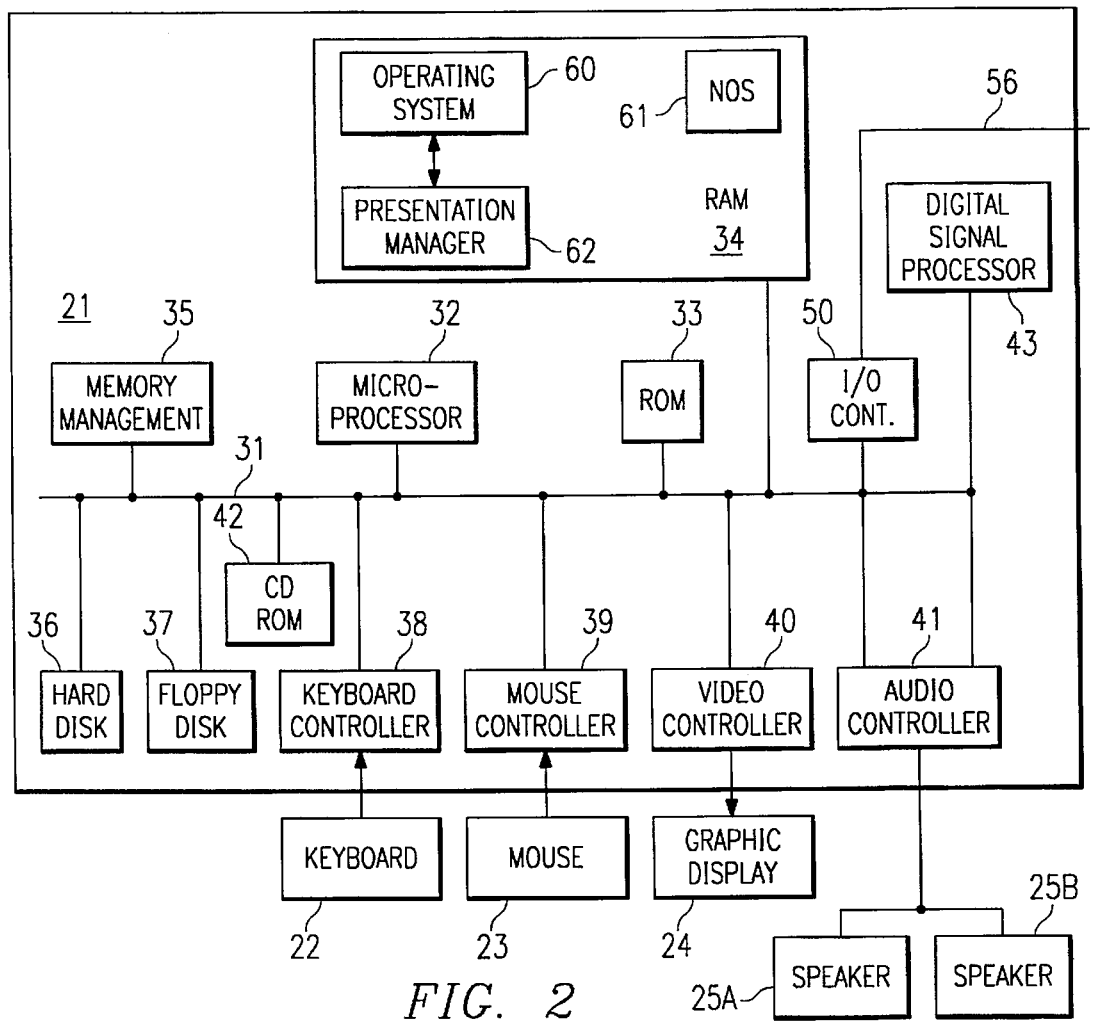
FIG. 2 is an architectural block diagram of the computer illustrated in FIG. 1.

FIG. 2 shows a block diagram of the components of the personal computer shown in FIG. 1. The system unit 21 includes a system bus or plurality of system buses 31 to which various components are coupled and by which communication between the various components is accomplished. The microprocessor 32 is connected to the system bus 31 and is supported by read only memory (ROM) 33 and random access memory (RAM) 34 also connected to system bus 31. A microprocessor in the IBM PS/2 series of computers is one of the Intel family of microprocessors including the 386 or 486 microprocessors. Other microprocessors included, but not limited to, Motorola's family of microprocessors such as the 68000, 68020 or the 68030 microprocessors and various RISC microprocessors such as the PowerPC™ microprocessor manufactured by IBM, and others made by Hewlett Packard, Sun, Intel, Motorola and others may be used in the specific computer.

The ROM 33 contains among other code the Basic Input-Output system (BIOS) which controls basic hardware operations such as the interaction and the disk drives and the keyboard. The RAM 34 is the main memory into which the operating system and application programs are loaded. The memory management chip 35 is connected to the system bus 31 and controls direct memory access operations including, passing data between the RAM 34 and hard disk drive 36 and floppy disk drive 37. The CD ROM 42, also coupled to the system bus 31, is used to store a large amount of data, e.g., a multimedia program or large database.

Also connected to this system bus 31 are various I/O controllers: the keyboard controller 38, the mouse controller 39, the video controller 40, and the audio controller 41. The keyboard controller 38 provides the hardware interface for the keyboard 22, the mouse controller 39 provides the hardware interface for the mouse 23, the video controller 40 is the hardware interface for the display 24, and the audio controller 41 is the hardware interface for the speakers 25a and 25b. An I/O controller 50 such as a Token Ring Adapter enables communication over the local area network 56 to other similarly configured data processing systems.

One of the preferred implementations of the present invention is as a set of instructions in a code module resident in the random access memory 34. Until required by the computer system, the set of instructions may be stored in another computer memory, for example, in the hard disk drive 36, or in a removable memory such as an optical disk for eventual use in the CD ROM 42 or a in a floppy disk for eventual use in the floppy disk drive 37. As shown in FIG. 2, the operating system 60 and the presentation manager 62 are resident in RAM 34.

As used herein, the inventive method is designed to be implemented on a computer such as shown in FIG. 1 although it should be appreciated that the word "computer" is to be afforded its broadest scope and meaning to include any type of device or part thereof that provides a computing functionality regardless of the particular application.

According to the invention, message authentication is achieved using a fast hash followed by a slower cryptographic transformation. Hashing is preferably achieved in a software-efficient scheme using a hash function drawn from a particular family of hash functions having the distinctive characteristic that the probability that two distinct strings "collide" (i.e., hash to the same value) is suitably small; e.g., less than $2^{-28}$. A family of hash functions that satisfy this criteria is said to be "quasi-universal". To make the scheme fast, a novel type of "quasi-universal" hashing, called "bucket hashing", is provided for use when the message to be hashed is sufficiently long. If shorter strings are necessary, further hashing is performed on the bucket-hashed string before the hashed message (which is then sufficiently short) is subjected to a cryptographic transformation to create the tag. This second-level or further hashing is preferably achieved with another family of quasi-universal hash functions, which provide "inner-product" hashing. If the message itself is short enough, the bucket hashing step can be omitted.

As will be discussed below, the particular hashing function(s) that are applied to reduce the message length depend on the size of the message and the desired length of the hashed message. The goal of the hashing step is to reduce the length of the message to a more manageable size such that the cryptographic transformation (which is slower than the hashing) is carried out on a shorter string. Efficient message authentication is thus achieved by a fast hashing procedure followed by a relatively slower encryption procedure carried out on a shorter string.

Figure 3:
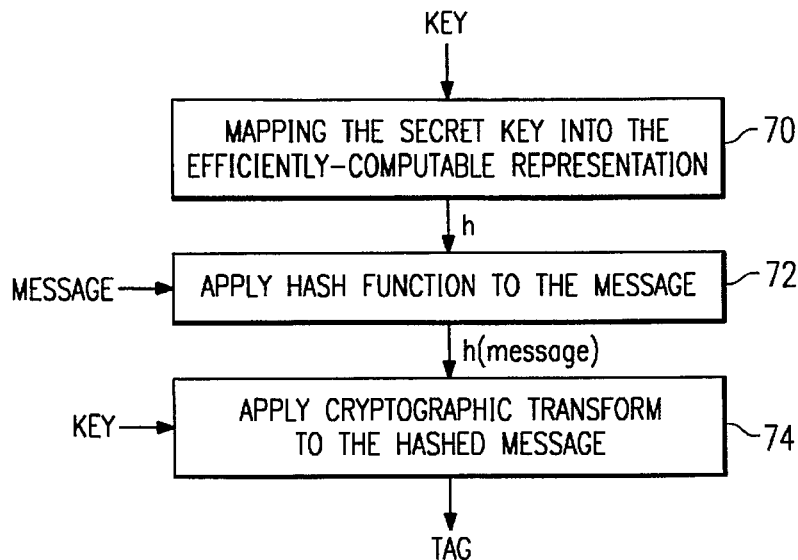
FIG. 3 illustrates a simplified flowchart of a method of the invention for generating a message authentication tag useful in authenticating a message provided by a sender to a verifier.

Turning now to FIG. 3, a flowchart is shown of the basic method of the invention for generating a message authentication tag useful in authenticating a message. The method begins at step 70 by mapping or "preprocessing" a secret key shared by the parties into an "efficiently-computable" representation of a hash function selected using the key from a family of quasi-universal hash functions. This is typically done off-line (i.e., before a message to be authenticated exists). The representation is said to be "efficiently computable" because it is designed to be carried out efficiently in software. In particular, the representation is either one or more tables of pseudorandom numbers to be used as data by a fixed piece of code, or a piece of code defining a sequence of instructions to be executed on the machine.

In the creation of the efficiently-computable representation, it is expected that the key is substantially stretched to make up the representation. Thus, for example, the secret key may be a 64 bit quantity while the table it is mapped to may be a 8 KByte quantity. This mapping may be a slow process but it is envisioned that it be performed only once and at a time that is not performance-critical in the machine.

At step 72, the selected hash function is then applied to the message to generate a hashed message having a length that is substantially shorter than the length of the message. Depending on the length of the message and the desired length of the hashed message, step 72 may involve one or more levels of hashing, including one or more levels of bucket hashing and/or one or more levels of inner-product hashing. At step 74, a cryptographic transformation is applied to the hashed message and to the secret key to generate the message authentication tag. Typically, the cryptographic transformation is relatively slow but the overall code generation is fast owing to the efficiency of the hash function in step 72 and the short length of the hashed message in step 74. The tag may then be combined with other information (such as the value of a counter used within cryptographic step 74) to form the message authentication code. Alternatively, the tag itself forms the code.

At the receiving end, the recipient receives the purported message with the code appended thereto. To determine if the message is authentic, the verifier carries out the same code generation performed by the sender (since he or she shares the same key and thus the same hash function and cryptographic transform) and verifies a tag match. Some piece of the message authentication code (e.g., the counter) may be used during this process. If a match occurs, the message is deemed authentic.

Figure 4:
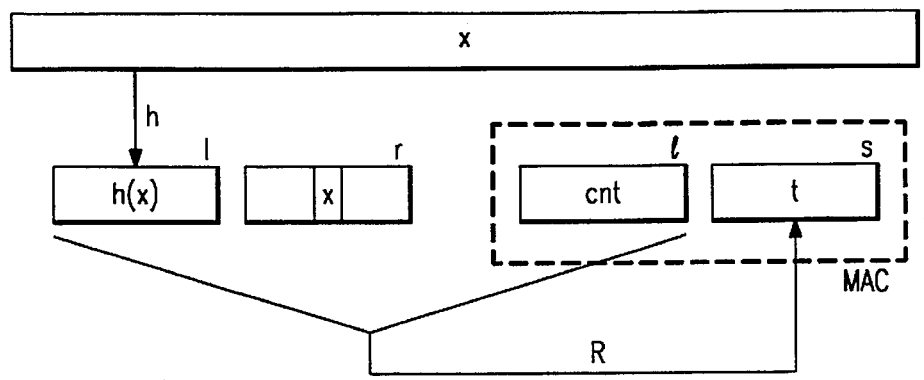
FIG. 4 illustrates an exemplary message authentication code format according to the invention.

FIG. 4 illustrates how a message authentication code (MAC) is formed in one simple embodiment of the invention. Here, the message x is bucket-hashed by hash function h derived from the secret key into a string h(x) of length 1, which is substantially shorter than the original message length. The hashed string h(x) is then combined (preferably by concatenation) with a string |x|, which identifies the length of message x, and with a counter value "cnt" of length l'. A cryptographic transform "R" based on the secret key k is then applied to the combined string to form the tag t of length s. Although not meant to be limiting, function R may be a known cryptographic hash function such as MD4, MD5 or the NIST Standard Secure Hash Algorithm (SHA), but modified to make use of bits derived from the secret key. Tag t and the counter value cnt are then combined (preferably by concatenation) to form the message authentication code. The message x and the code are then sent to the verifier for message authentication.

Figure 5:
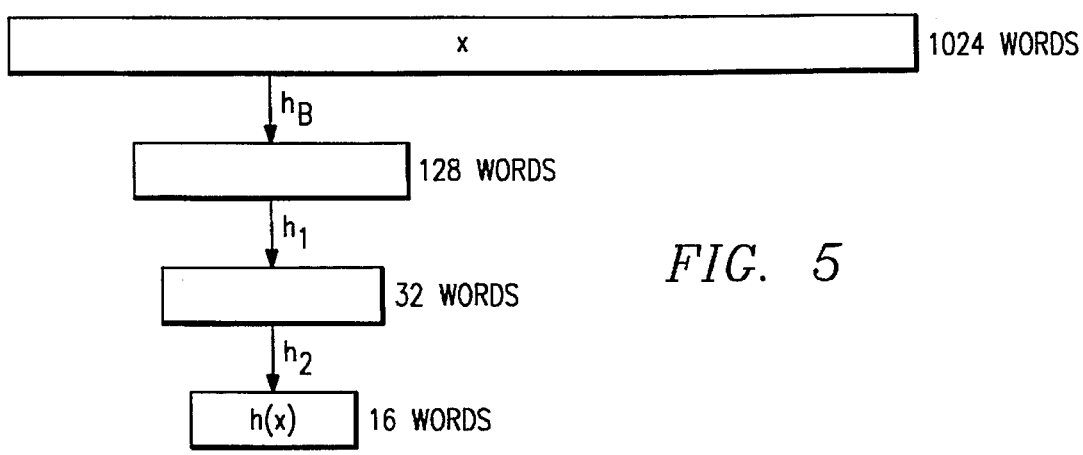
FIG. 5 illustrates one multi-level technique for hashing a relatively long message string into a short string upon which a cryptographic transform may then be applied according to the invention.

To achieve efficient processing in software, it is desired that the hashed message string h(x) be about 16 words. With relatively long messages, hashing is achieved using one or more hash functions in a multi-level approach. One such approach is illustrated in FIG. 5 for a 1024-word message x. Initially, the length of the message is reduced by a factor of 8 (to 128 words) using bucket hash function $h_B$. Thereafter, the bucket-hashed string is subjected to a first level of inner-product hashing $h_1$ that reduces the length by another factor of 4, to 32 words. Another level of inner-product hashing $h_2$ is then performed to reduce the length by a factor of 2, to 16 words. As will be described, a cryptographic transform (e.g., an MD4-derived procedure) then processes this final 16-word string to generate the tag.

According to the invention, a novel hashing procedure is described that takes a message and generates a relatively short string, or hashed message. The method uses a secret key and begins by mapping the key into an "association" of each word of the string to a set of words of the message. Each word of the string is then formed by combining the words of the message associated therewith. The association may be given by a table that specifies, for each word of the string, the words of the message to which the word of the string is associated. Or the table may specify, for each word of the message, the words of the string to which the word of the message is associated. Alternatively, the association may be represented by a sequence of instructions executable on a computer, with the sequence of instructions computing each word of the string by combining the associated words of the message.

In a more particular embodiment, this hashing procedure involves defining a fixed number of indices identifying "buckets" (which may be registers or memory locations in the physical machine) in which words of the message may be placed. The indices define the association of words of the original message to words of a string that forms the hashed message. To reduce the message length, each word of the message is placed into a unique subset (e.g., a triple or more generally a c-tuple) of buckets. In one embodiment, no word of the message is associated to the same c-tuple. For example, if c=3, the first word of the message may be placed into a tuple (e.g., buckets 1, 46 and 121), the second word may be placed into a tuple (buckets 3, 23 and 45), the third word in another unique tuple and so forth, until all of the words of the message are processed. No word is placed in the same tuple in this embodiment. The hash function drawn from the quasi-universal family is specified by the particular list of tuples used to define where each word of the message is cast. As a new word (from the original message) is placed in a bucket, it is combined with whatever word is already there (e.g., by an XOR operation), and the process continues. After the words in the message have been processed, each bucket includes a word (which is the XOR of all words cast therein during the processing of the original message). These words are then combined (again preferably by concatenation) to form the hashed message.

The bucket hashing procedure is now defined more formally. The procedure begins by fixing a domain $D=(0,1)^{bn}$, where $b \geq 1$ is the "wordsize" and $n \geq 1$ is the number of words to be hashed. A parameter $N \geq 2$ is also fixed as the "number of buckets." As a typical example, b=32, n=1024, and N=128. Each hash function h from $H_B[n, N]$ is specified by a length n list of size c subsets of [1. . . N], for some constant c (e.g., c=2 or 3). This list is denoted by $(h_1, \ldots, h_N)$, and the elements of $h_i$ are denoted by $(h^1_i, \ldots, h^c_i)$. With h defined in this manner, the bucket hashing routine h(x) is then defined by the following algorithm. Let $x = x_1 \ldots x_n$, with each $|x_i| = b$. First, initialize $y_j$ to $0^b$ for each $j \in [1 \ldots N]$. Then, for each $i \in [1 \ldots n]$ and each $k \in h_i$, replace $y_k$ by $y_k \oplus x_i$. When done, set $h(x) = y_1 \| y_2 \| \cdots \| y_N$.

The computation of a h(x) can be envisioned as follows. There are N buckets, each initially empty. The first word is thrown into the buckets specified by $h_1$. The next word is thrown into the buckets specified by $h_2$. And so on, with the last word being thrown into the buckets specified by $h_n$. The N buckets then contain a total of cn words. Exclusive OR (XOR) the contents of each bucket (with the XOR of no words being defined as $0^b$). The hash of x is the concatenation of these N words.

It should be appreciated that the use of "triples" in the bucket hashing routine is merely exemplary. The technique works with other c-tuple constructs (e.g., a hashing scheme based on 2-tuples or 4-tuples) and with other constraints specifying the acceptable sets of indices to associate to each word of the message. It is also permissible to allow words of the message to be associated with a varying number of words of the hashed string, for example, some words of the message being associated with one word of the string and other words of the message being associated with two words of the string. A variety of criteria may be used to determine which set of buckets are eligible to receive each word.

As noted above, if it is necessary to reduce the length of the hashed message still further, one or more so-called key-based "table hashing" routines may be used. As used herein, "table hashing" refers to a routine that uses the secret key for hashing a message (or string) consisting of a sequence of fixed-length bytes into an output. This is achieved by first mapping the key into a table. For each byte of the message, the routine then modifies a variable (set to an initial value) by replacing it by a function of the current value of the variable, the value of the byte, the position of the byte within the message, and an entry retrieved from the table. One specific hash (associated to a software implementation of a CRC) which would be an instance of the above table hashing routine is set forth below:

Let $x = x_0 \ldots x_{n-1}$, where each $x_i$ is an 8-bit byte.

$$s \leftarrow 0$$

for $i \leftarrow 0$ to $n-1$ do $$s \leftarrow (s \!\!>\!\!> 8) \oplus T[\, (s \wedge \text{0xff}) \oplus x_i \,]$$

return $s$

A particular type of table hashing routine is so-called "inner-product" hashing. Generally, an inner-product hashing routine operates by partitioning the string to be hashed into a sequence of bytes (e.g., 8-bits per byte). The contents of some of the bytes are then used to index into a table associated to that byte. The words found in said table are derived from the key. Words retrieved from the table are then combined (e.g., by an XOR operation) together with some additional words drawn from the string. This operation is used, for example, to hash 4-word groups of the string into one word.

A table hash method (associated to computing the inner product of two vectors) is:

$$s \leftarrow 0$$

for $i \leftarrow 0$ to $n-5$ do

—continued $$s \leftarrow s \oplus T_i[x_i]$$

$$s \leftarrow s \oplus x_{n-4} x_{n-3} x_{n-2} x_{n-1}$$

return $s$

Thus, for each byte of a message, the table hashing routine modifies a variable (set to an initial value) by replacing it by a function of the current value of the variable, the value of the byte, the position of the byte within the message, and an entry retrieved from the table. The function used is the current value exclusive-ORed with some second function of the value of the byte, the position of the byte and the entry retrieved from the table. In one concrete example, when the position of the byte is within some range, the second function consists of the entry retrieved from the table at a position indexed by both the value of the byte and the position of the byte; in such case, when the position of the byte is outside the range, the second function consists of the byte itself shifted by some amount.

Although not meant to be limiting, one way of implementing the table T would be as a pseudorandom sequence derived from the key. There are a variety of known techniques to stretch the key into the requisite number of bits to fill the table.

Where there are not as many tables as the messages has bytes, it is desirable to break the message into blocks and treat each block independently, hashing each block into one word. These words are then concatenated. This entire process can be carried out some number of times (with different tables associated to each level) until the length of the string is reduced to a desired amount.

One particular embodiment of the invention implemented in pseudocode is illustrated below. For convenience, the following notation is used herein. Numbers in hexadecimal are written by preceding them with "0x" and then using the symbols "a"–"f" to represent decimal 10–15, respectively. Numbers in binary are given a subscript 2. The symbols "$\wedge$" "V" and "$\oplus$" denote bitwise AND, OR and XOR functions. The symbol "$\|$" denotes the concatenation operator. The symbol $|x|_n$ denotes the length of string x measured in n-bit words. By $|x|$ we mean $|x|_1$. The symbol $\lambda$ denotes the empty string. The symbol $\{i\}_n$ denotes the binary encoding at the number i into n bits. The symbol X is used for matrix multiplication. The designation A[i] means the i-th entry of the array A. Further, if x is a real number, then $\lceil x \rceil$ denotes the smallest integer greater than or equal to x, and $\lfloor x \rfloor$ denotes the largest integer less than or equal to x.

A MAC-generation algorithm for 32-bit machines:

/*Given a string x, where $|x| < 2^{64}$, a string key, and a number cnt, $0 \leq cnt < 2^{64}$, this procedure returns a 128-bit MAC for authenticating x. */ function MAC-generate$_{\text{key}}^{\text{cnt}}(x)$         --Returns 4-word MAC Let pad_bits be the smallest number p such that $|x| + p$ is divisable by 32

$x' \leftarrow x \| 0^{\text{pad\_bits}}$         --Pad to word boundary

Let nblks $\leftarrow \min\{1, \lceil |x'|_{32}/1024 \rceil\}$         --No of 1024-word blocks Let $B_1 \ldots B_{nblks} = x'$, where each $B_i$ except possibly the last is 1024 words -continued $y \leftarrow \lambda$ for $i \leftarrow 1$ to $nblks$ do $y \leftarrow y \| \textit{Hash\_Block}_{key}(B_i)$ Replace leftmost 16 words of $y$ by its XOR with Key-16-Words (key)

$ABCD \leftarrow \langle cnt \rangle_{64} \| \langle |x| \rangle_{64}$ $ABCD \leftarrow ABCD \oplus \textit{Key-4-Words}_{(key)}$ $\textit{digest} \leftarrow MD'(ABCD, y)$     --MD4 w/out padding Let $cnt_0 cnt_1 = cnt$, where $|cnt_i| = 32$ Let $digest_0 digest_1 digest_2 digest_3 = digest$, where $|digest_i| = 32$ $MAC \leftarrow cnt_1 \| digest_0 \| digest_1 \| cnt_0$ return MAC /*Given a string $x$, which is a sequence of at most 1024 words, and a string $key$, the following code produces a 16-word hash value for $x$ using bucket hashing and/or inner-product hashing, depending on $|x|$.*/ function $\textit{Hash-Block}_{key}(x)$     --Returns 16 words $y \leftarrow x$ if $|y|_{32} \geq 512$ then $y \leftarrow \textit{Bucket-Hash}_{key}(y)$ if $|y|_{32} \geq 64$ then $y \leftarrow \textit{Inner-Prod-Hash-4A}_{key}(y)$ if $|y|_{32} \geq 64$ then $y \leftarrow \textit{Inner-Prod-Hash-4B}_{key}(y)$ if $|y|_{32} > 16$ then $y \leftarrow \textit{Inner-Prod-Hash-2}_{key}(y)$ if $|y|_{32} < 16$ then $y \leftarrow y \| 0^{32(16-|y|_{32})}$ /*Given a string $x$, which is a sequence of at most 1024 words, and a string $key$, the following code produces a 128-word hash of $x$. This is done by bucket hashing into 128 buckets.*/ function $\textit{Bucket-Hash}_{key}(x)$     --Returns 128 words $(h_0^1, h_0^2, h_0^3, h_1^1, h_1^2, h_1^3, \ldots, h_{1023}^1, h_{1023}^2, h_{1023}^3) \leftarrow$ $\textit{Key-Buckets-128}_{(key)}$ Let $n = |x|_{32}$ Let $x_0 \ldots x_{n-1} = x$, where $|x_i| = 32$ for $i \leftarrow 0$ to 127 do $y_i \leftarrow 0^{32}$
for $i \leftarrow 0$ to $n - 1$ do     --Put each $wd$ in 3 bkts $y^1_{h_i} \leftarrow y^1_{h_i} \oplus x_i$ $y^2_{h_i} \leftarrow y^2_{h_i} \oplus x_i$ $y^3_{h_i} \leftarrow y^3_{h_i} \oplus x_i$ return $y_0 \| y_1 \| \ldots \| y_{127}$ /*Given a string $x$, which is a sequence of words, and a string $key$, this code hashes $x$ to a string of length $\lceil |x|_{32}/4 \rceil$. This is done by inner-product hashing each four words into one word.*/ function $\textit{Inner-Prod-Hash-4A}_{key}(x)$

Let $pad\_bits$ be the smallest number $p$ such that $|x| + p$ is divisible by 128

$x' \leftarrow x \| 0^{pad\_bits}$     --Pad to a 4-word boundary

-continued

Let $x_0 \ldots x_{n-1} = x'$, where $|x_i| = 128$ $y \leftarrow \lambda$ for $i \leftarrow 0$ to $n - 1$ do Let $w_{012} w_3 = x_i$, where $|w_{012}| = 96$ and $|w_3| = 32$ $y_i \leftarrow y \| (w_{012} \times \textit{Key-Inner-Prod-4A}_{(key)}) \oplus w_3$
    --Matrix mult: $96n32$ matrix return $y$ function $\textit{Inner-Prod-Hash-4B}_{key}(x)$ Let $pad\_bits$ be the smallest number $p$ such that $|x| + p$ is divisible by 128

$x' \leftarrow x \| 0^{pad\_bits}$     --Pad to a 4-word boundary

Let $x_0 \ldots x_{n-1} = x'$, where $|x_i| = 128$ $y \leftarrow \lambda$ for $i \leftarrow 0$ to $n - 1$ do Let $w_{012} w_3 = x_i$, where $|w_{012}| = 96$ and $|w_3| = 32$ $y_i \leftarrow y \| (w_{012} \times \textit{Key-Inner-Prod-4B}_{(key)}) \oplus w_3$ return $y$ /*Given a string $x$, which is a sequence of $n$ words, $17 \leq n \leq 32$, and a string $key$, this hashes $x$ to 16 words. This is done by inner-product hashing pairs of words into one word. This is done only to the minimal-length suffix of $x$ which will result in the hashed value being 16 words. The rest of $x$ is left in place.*/ function $\textit{Inner-Prod-Hash-2}_{key}(x)$     --Returns 16 words

Let $n = |x|_{32}$

Let $x_0 \ldots x_{n-1} = x$, where $|x_i| = 32$ $y \leftarrow y_0 \ldots x_{31-n}$     --Copy prefix into $y$. $y = \lambda$ if $n = 32$ for $i \leftarrow 1$ to $n - 16$ do $y \leftarrow y \| (x_{30+2i-n} \times \textit{Key-Inner-Prod-2}_{(key)}) \oplus x_{31+2i-n}$
    --Matrix mult: $32 \times 32$ matrix return $y$ /*All the remaining routines map $key$ into the necessary tables. The details are included for completeness.*/ function $\textit{Key-16-Words}_{(key)}$     --Returns 16 words return $F^0_{key}(0) \| F^0_{key}(1) \| \ldots \| F^0_{key}(15)$ function $\textit{Key-4-Words}_{(key)}$     --Returns 4 words return $F^1_{key}(0) \| F^1_{key}(1) \| F^1_{key}(2) \| F^1_{key}(3)$ /*Returns a list of $3 \times 1024$ numbers, each between 0 and 127.*/ function $\textit{Key-Buckets-128}_{(key)}$ $s \leftarrow -1$ repeat for $i \leftarrow 0$ to 1023 do repeat -continued $$s \leftarrow s+1$$

$$h_i^0 h_i^1 h_i^2 h_i^3 \leftarrow F2_{key}(s), \text{ where } |h_i^j|=8$$

$$h_i^1 \leftarrow h_i^1 \wedge 01111111_2$$

$$h_i^2 \leftarrow h_i^2 \wedge 01111111_2$$

$$h_i^3 \leftarrow h_i^3 \wedge 01111111_2$$

until $h_i^1 \neq h_i^2 \wedge h_i^2 \neq h_i^3 \wedge h_i^1 \neq h_i^3$ until there is no $J_j \leq i$ s.t.$\{h_i^1, h_i^2, h_i^3\} = \{h_j^1, h_j^2, h_j^3\}$ return $(h_0^1, h_0^2, h_0^3, h_1^1, h_1^2, h_1^3, \ldots, h_{1023}^1, h_{1023}^2, h_{1023}^3)$ /*Returns 96 × 32 binary matrix*/ function $Key\text{-}Inner\text{-}Prod\text{-}4A_{(key)}$ $$\text{return} \begin{bmatrix} F_{key}^3(0) \\ F_{key}^3(1) \\ \cdot \\ \cdot \\ \cdot \\ F_{key}^3(95) \end{bmatrix}$$

/*Returns 32 × 32 binary matrix*/ function $Key\text{-}Inner\text{-}Prod\text{-}4A(key)$ $$\text{return} \begin{bmatrix} F_{key}^4(0) \\ F_{key}^4(1) \\ \cdot \\ \cdot \\ \cdot \\ F_{key}^4(31) \end{bmatrix}$$

/*Pseudorandom function returns 1 word*/ function $F_{key}^i(n)$ $ABCD \leftarrow (<i>_{64} \| < \lceil n/4 \rceil >_{64}) \oplus const$ $digest_0 digest_1 digest_2 digest_3 \leftarrow MD4(ABCD, _{key})$ return $digest_{n \bmod 4}$ Another use of a software-efficient message authentication code is to ensure that only authorized programs are executed by the computing system. For example, some computer systems aim to disallow the end user from installing his own executable code. Such a restriction can help ensure that the computing system remains as the system administrator configured it, free of viruses or other potentially damaging software. In such a protected computing environment, programs can be tagged with a message authentication code computed over the program itself and using a key which is known only by the operating system software. The operating system, before it executes a program, would check that the program bears a valid message authentication code. The end-user, not knowing the key, would be unable to generate a new program together with a valid MAC for it.

The same approach described above to protect a program object can be used to protect any type of data set from unauthorized modification or introduction. As one example, it may be desirable to tag all the (non-executable) files which are part of a sensitive database, having the database software ensure that use is made only of properly tagged database files. As used herein, "data set" is meant to be broadly construed to cover programs, files and other information stored in the storage device of the computer.

It should be appreciated by those skilled in the art that the specific embodiments disclosed above may be readily utilized as a basis for modifying or designing other routines for carrying out the same purposes of the present invention. For example, it should be readily appreciated that while the preferred embodiment implements the invention in 32-bit processor, the method is also applicable to other execution vehicles including 64-bit machines. A scheme using suitably-selected bucket pairs instead of bucket triples can provide significant efficiencies. Those skilled in the art will recognize that such equivalent techniques and embodiments do not depart from the spirit and scope of the invention as set forth in the appended claims.

What is claimed is:

1. A method, using a key and implementable on a computer, for hashing a message consisting of a sequence of words into a string having a length shorter than the length of the message, comprising the steps of:

(a) mapping the key into an association of each word of the string to a set of words of the message;

(b) forming each word of the string by combining the words of the message associated therewith;

wherein the association is represented as a table specifying, for each word of the string, the words of the message to which said word of the string is associated.

2. A method, using a key and implementable on a computer, for hashing a message consisting of a sequence of words into a string having a length shorter than the length of the message, comprising the steps of:

(a) mapping the key into an association of each word of the string to a set of words of the message;

(b) forming each word of the string by combining the words of the message associated therewith;

wherein the association is represented as a table specifying, for each word of the message, the words of the string to which said word of the message is associated.

3. A method, using a key and implementable on a computer, for hashing a message consisting of a sequence of words into a string having a length shorter than the length of the message, comprising the steps of:

(a) mapping the key into an association of each word of the string to a set of words of the message;

(b) forming each word of the string by combining the words of the message associated therewith;

wherein the association is represented by a sequence of instructions executable on the computer, this sequence of instructions computing each word of the string by combining the associated words of the message.

4. The method as described in claim 1 wherein each word of the message is associated to two words of the string.

5. The method as described in claim 1 wherein each word of the message is associated to three works of the string.

6. A method, using a key and implementable on a computer, for hashing a message consisting of a sequence of words into a string having a length shorter than the length of the message, comprising the steps of:

(a) mapping the key into an association of each word of the string to a set of words of the message;

(b) forming each word of the string by combining the words of the message associated therewith;

wherein the words of the message are combined by an exclusive OR operation.

7. A method, using a key and implementable on a computer, to generate a message authentication tag useful in authenticating a message, comprising the steps of:

mapping the key into an efficiently-computable representation of a hash function selected from a family of hash functions, wherein the family of hash functions is characterized by the property that the probability that distinct strings hash to the same value is small;

applying the selected hash function to the message to generate a hashed message having length shorter than the length of the message; and applying a cryptographic transformation to the hashed message and the key to generate the message authentication tag.

8. The method as described in claim 7 wherein the hashed message is computed at least in part by forming a string, each word of the string being the exclusive OR of a subset of words drawn from the message.

9. The method as described in claim 8 wherein the efficiently-computable representation of the hash function is a table that specifies the subset of words that are exclusive-ORed to form each word of the string.

10. The method as described in claim 7 wherein the efficiently-computable representation is a sequence of instructions to be executed by a computer.

11. A computer, comprising:

a storage device;

program means supported in the storage device for generating a message authentication tag useful in authenticating a message, the program means comprising:

means for mapping the key into an efficiently-computable representation of a hash function selected from a family of hash functions, wherein the family of hash functions is characterized by the property that the probability that distinct strings hash to the same value is small;

means for applying the selected hash function to the message to generate a hashed message having a length shorter than the length of the message; and means for applying a cryptographic transformation to the hashed message and the key to generate the message authentication tag.

12. A program storage device readable by a processor and tangibly embodying a program of instructions executable by the processor to perform a method, using a secret key, for hashing a message into a string having a length shorter than the length of the message, wherein the method comprises the steps of:

(a) mapping the key into an association of each word of the string to a set of words of the message; and (b) forming each word of the string by combining the words of the message associated therewith;

wherein each word of the message is associated to a varying number of words of the string.

13. A method for authenticating messages transmitted among a set of entities in a distributed computer system, comprising the steps of:

establishing a secret key shared by the set of entities;

having each of the entities map the secret key into an efficiently-computable representation of a hash function selected from a family of hash functions, wherein the family of hash functions is characterized by the property that the probability that distinct strings hash to the same value is small;

having an entity desiring of transmitting a message apply the selected hash function to message to generate a hashed message having a length shorter than the length of the message; and having the entity apply a cryptographic transformation to the hashed message and the key to generate a message authentication tag; and having the entity transmit the message and its associated message authentication tag.

14. The method as described in claim 13 further including the steps of:

having an entity among the set of entities who receives the message and its associated message authentication tag verify the validity of the message authentication tag.

15. A method, using a key and implementable on a computer, for hashing a message consisting of a sequence of fixed-length bytes, into an output, comprising the steps of:

mapping the key into a table;

assigning a variable an initial value;

for each byte of the message, modifying the variable by replacing it by a function of its current value, a value of the byte, a position of the byte within the message, and an entry retrieved from the table; and defining the output to be the final value of the variable.

16. The method as described in claim 15 wherein the function is the current value exclusive-ORed with some second function of the value of the byte, the position of the byte and the entry retrieved from the table.

17. The method as described in claim 16 wherein when the position of the byte is within some range, the second function consists of the entry retrieved from the table at a position indexed by both the value of the byte and the position of the byte, and wherein when the position of the byte is outside the range, the second function consists of the byte itself shifted by some amount.

* * * * *